3,689,425
DETERGENT COMPOSITIONS CONTAINING
NOVEL OPTICAL BRIGHTENING AGENTS
Nathan N. Crounse, Cincinnati, Ohio, assignor to
Sterling Drug Inc., New York, N.Y.
No Drawing. Continuation-in-part of application Ser. No.
655,339, July 24, 1967, now Patent No. 3,575,956. This
application June 15, 1970, Ser. No. 46,482
Int. Cl. C09d 23/00; C09k 1/00; C11d 9/30
U.S. Cl. 252—117                                      3 Claims

ABSTRACT OF THE DISCLOSURE 2-benzoxazol-6-yl-2H-naphtho[1,2-d]triazoles, 2-benzothiazol-6-yl-2H-naphtho[1,2-d]triazoles and 2-benzimidazol-6-yl-2H-naphtho[1,2-d]triazoles, having attached at the 2-position of the benz-X-azol-6-yl ring thereof a substituent of from 8–18 carbon atoms and 4–8 conjugated double bonds, are optical whitening and brightening agents having particularly desirable shades of fluorescence.

This application is a continuation-in-part of my prior copending United States patent application Ser. No. 655,339, filed July 24, 1967, now U.S. Pat. 3,575,956, issued Apr. 20, 1971.

This invention relates to novel fluorescent compounds of the naphthotriazole type useful as whitening and brightening agents and to the preparation thereof.

The present invention provides new fluorescent whitening and brightening agents which are useful in the treatment of threads, sheets, films, filments, textile fabrics and the like, as well as in the manufacture of paper, varnishes, inks, coatings and plastics. In particular, my invention provides whitening and brightening agents of the naphthotriazole series which have a pleasing shade of fluorescence and have good stability to light and to chlorine-type bleaches.

The novel compounds of my invention are 2H-naphtho[1,2-d]triazoles bearing in the 2-position thereof a benz-X-azol-6-yl radical, in turn having a substituent in the 2-position thereof which is an organic radical of about eight to eighteen carbon atoms and having from four to eight conjugated double bonds, from zero to two of which are incorporated into an acyclic bridge, wherein X is O, S or N-R. The benz-X-azol-6-yl radical is a member selected from the class consisting of benzoxazol-6-yl, benzothiazol-6-yl, and benzimidazol-6-yl radicals. The 2H-naphtho[1,2-d]triazole portion of the structure of my new compounds is either unsubstituted or bears water solubilizing groups of the carboxylic or sulfo class.

The compounds of my invention are depicted structurally as shown in Formula I,

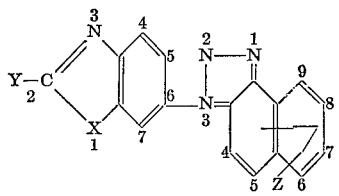

Formula I wherein X is a member of the class consisting of O, S, and N-R, where R is a member of the class consisting of H, lower alkyl, hydroxyl-lower alkyl, hydroxy-oxaalkyl, phenyl-lower alkyl, cyano-lower alkyl, carboxy-lower alkyl, carbalkoxy-lower alkyl, phenyl-hydroxyl-lower alkyl, and lower alkenyl; Y is an organic radical of from eight to eighteen carbon atoms containing from four to eight conjugated double bonds, from zero to two of which are incorporated into an acyclic bridge; and Z is a member of the class consisting of H, from one to two carboxy, and from one to two sulfo groups.

The compounds of Formula I, in which as above indicated the substituent Y contains at least four conjugated double bonds, have a desirable blue shade of fluorescence. This is in contrast with the properties of the corresponding compounds wherein Y contains less than four conjugated double bonds, which have a poor shade of fluorescence, i.e., they appear red or reddish-violet under the influence of ultraviolet light, and on the other hand is in contrast with the properties of the corresponding compounds wherein the number of conjugated double bonds in the substituent Y exceeds eight, in which the fluorescence tends to be too yellow for the resulting compounds to be useful as whitening and brightening agents according to present standards.

I have also found that compounds of Formula I wherein Y contains more than eight conjugated double bonds tend to absorb light in the visible region of the spectrum and thus appear colored. These compounds are generally unacceptable as whitening and brightening agents. Hence I consider the range of four to eight conjugated double bonds in the Y substituent to be a critical feature of my invention. The Y function in Formula I may be varied widely within the definition set forth above to provide species within the ambit of my invention.

Preferred groups represented by the term Y are those having the structure

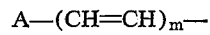

wherein A is a cyclic aromatic radical containing from four to seven internally conjugated double bonds and $m$ is an integer having a value of 0–2 such that the sum of $m$ and the number of conjugated double bonds in the cyclic aromatic radical A falls within the range four to eight.

Among those groups represented by the substituent Y which are considered of particular value for the purposes of my invention are styryl, 5-phenyl-2-furyl, 2-quinolinyl, 3-coumarinyl, 2-naphthyl, 2-benzofuranyl, 2-(6-methylbenzofuranyl) 2-dibenzofuranyl, 3-dibenzofuranyl, p-(3-coumarinyl)phenylene, 2-benzoxazolyl, 2-(benzoxazol-2-yl)vinyl, 2-(2-benzimidazolyl)-vinyl, 4-stilbyl, 4-(2-furyl)-1,3-butadienyl, 3-indolyl, 2-indenyl, 9-phenanthryl, 9-fluorenyl, 2-quinoxalinyl, 4-(2-thienyl)-1,3-butadienyl, 2-(2-pyridyl)vinyl, 2-(4-pyridyl)-vinyl, 4-methylstyryl, 2-(2-naphthyl)vinyl, 2-(1-naphthyl)vinyl, 4-phenyl-1,3-butadienyl, 2-(4-phenylyl)vinyl, and the like.

In Formula I, X is O, S, or N-R. When X is N-R, the R is a radical of the class consisting of H; lower alkyl, preferably containing from one to six carbon atoms, for example, methyl, ethyl, isopropyl, n-propyl, n-butyl, isobutyl, and n-hexyl; hydroxy-lower alkyl, preferably containing from two to six carbon atoms, for example, 2-hydroxyethyl, 2-hydroxypropyl, and 2,3-dihydroxypropyl; hydroxy-oxaalkyl, preferably containing from three to fifteen carbon atoms, for example 2-hydroxy-3-(2,3-dihydroxypropoxy)propyl, 2 - hydroxy-3-(2-hydroxyethoxy propyl, and 2 - hydroxyl-3-[2-(2-hydroxyethoxy)ethoxy] propyl; phenyl-lower alkyl, preferably containing from seven to eleven carbon atoms, for example benzyl, phenethyl, 3-phenylpropyl and 3-phenylpentyl; cyano-lower alkyl, preferably containing from three to six carbon atoms, for example, 2-cyanoethyl, 3-cyanopropyl and 4-cyanopentyl; carboxy-lower alkyl, preferably containing from two to six carbon atoms, for example, carboxymethyl, 2 - carboxyethyl, 3-carboxypropyl and 5-carboxypentyl; carbo-lower alkoxy-lower alkyl, preferably containing a total of from three to twelve carbon atoms, for example, carbomethoxymethyl, 2 - carbomethoxyethyl, 2-carbobutoxyethyl, 3 - carbohexyloxypropyl and 5-carbomethoxypentyl; phenyl-hydroxy-lower alkyl, preferably containing from eight to eleven carbon atoms, for example β-phenyl-β-hydroxyethyl, α-phenyl-β-hydroxyphenyl, and β-phenyl-β-hydroxypropyl; and lower alkenyl preferably containing from 3 to 6 carbon atoms, for example, allyl, methallyl, and 3,3-dimethallyl.

In Formula I, Z is H, one or two carboxy, or one or two sulfo substituents. As indicated by the bond in Formula I, which is not directed to any specific position, where Z is carboxy or sulfo, it may be attached at any of the six available positions on the naphtha[1,2-d]triazole ring, and when more than one such substituent is present, they may be in any of the several positions related to each other. Where Z is a carboxy or sulfo, its presence is for the purpose of imparting water solubility and/or dispersibility to the resulting compound through salt fomation. Thus, the commonly-used alkali metal and quaternary ammonium salts of said compounds are the full equivalents of the corresponding free acids herein claimed.

In general, the compounds of Formula I are high-melting tan to yellow solids. The compounds wherein Z is hydrogen are insoluble in water, the lower alcohols, ketones and mineral acids, and they are moderately soluble in dimethylformamide and high-boiling, non-polar aromatic hydrocarbons. The compounds wherein Z is carboxy or sulfo, in their free acid form, are substantially insoluble in water and are moderately soluble in dimethylformamide dimethylsulfoxide and acetic acid, and in the form of their alkali metal or quaternary amomnium salts, have low solubility in water and are generally moderately soluble in 2-ethoxyethanol and dimethylformamide.

When the compounds of the present invention are dispersed or dissolved in aqueous media, they fluoresce blue-white under ultraviolet light. Those compounds having carboxy or sulfo substituents are particularly substantive to a wide variety of natural and syntehtic fibers, for example cotton, cellulose acetate, viscose rayon and nylon, and are absorbed by such fibers from very low concentrations in aqueous dispersions. Those compounds having no carboxy or sulfo substituents are particularly adapted to incorporation into plastic and synthetic fiber melts and to application to fabrics by the known heat-setting procedures. The compounds of the invention also have high stability to sunlight, soap, synthetic detergents and chlorine-type bleaches.

The above-described properties of my new compounds make them especially valuable as whitening and brightening agents in treating white and colored fabrics in order to neutralize the yellowness which develops in white textiles and to enhance the brilliance of colored textiles. In such utilization the high resistance of my compounds to chlorine bleaches and to light are distinct advantages. A further important advantage of the compounds of my invention lies in their property of building up the amount of whitening agent on the fibers of textiles on repeated application of the whitening agent without developing an undesirable discoloration, for example a reddish or grey color, such as is produced by many of the known optical bleaching agents when they are applied repeatedly, as in successive launderings.

The compounds of my invention are conveniently prepared by diazotizing a 6-aminobenz-X-azole appropriately substituted in the 2-position thereof by substituent Y, then coupling the diazonium salt thus formed to either a 1-aminonaphthalene which is substituted in the 4-position or a 2-aminonaphthalene which is either unsubstituted or substituted with one or two carboxy groups or one or two sulfo groups, as desired, and then oxidizing the resulting ortho-amino azo compound according to known methods to give the desired 2-substituted-2H-naphtho[1,2-d]triazole of Formula I.

Diazotization of the intermeidate 6-aminobenz-X-azole compounds is readily carried out by methods well known in the art, for example by dissolving the amine in an excess of mineral acid, for example, hydrochloric acid, in ice and adding a molecular equivalent of sodium nitrite. Where the 6-aminobenz-X-azole or the resulting diazonium salt is only slightly soluble in aqueous mineral acid, the addition of acetic acid or dimethylformamide generally helps to keep the material in solution.

The coupling reaction is preferably carried out in acid medium at room temperature, whereby said diazonium compound is coupled to an aminonaphthalene adapted for coupling in a position ortho to the amino group. This condition implies that the amino group is located in position 2 of the naphthalene ring, and that position 1 is unsubstituted; or that the amino group is located in position 1 of the naphthalene ring, that position 2 is unsubstituted, and also that position 4 is blocked by a carboxy or sulfo group in order that coupling will not occur in the 4-position, that is, para to the amino group. When the coupling reaction is complete, I prefer to heat the reaction mixture to about 90° C. for several hours to increase the crystal size of the resulting pigment.

The resulting ortho-amino-azo compound is converted to the desired triazole compound by oxidation procedures well known in the art. For example, the ortho-amino-azo compound is heated in an aqueous solution of cupric sulfate containing an excess of an amine, for example ammonium hydroxide or pyridine, or alternatively, in an aqueous alkaline solution of sodium hypochlorite. Oxidation to the desired naphthotriazole is complete when the deep color of the intermediate azo dye has disappeared. The product is conveniently isolated from the reaction mixture by pouring the latter into an excess of mineral acid (for example hydrochloric acid or sulfuric acid) in ice, and collecting the 2-substituted-2H-naphtho[1,2-d]triazole of Formula I which precipitates. The products are purified by recrystallization from organic solvents in the usual manner.

Those compounds of Formula I wherein X is N-H are conveniently alkylated according to procedures known in the art. For example, U.S. Pat. 2,838,504 presents a full disclosure of methods for alkylation of the benzimidazole ring which are applicable here; and in particular, those procedures are useful for substituting in the benzimidazole ring in the 1-position the following groups: lower alkyl, hydroxy-lower alkyl, 2-hydroxy-3-sulfopropyl, hydroxy-oxaalkyl, carboxy-lower alkyl, cyanolower alkyl, monocyclic aralkyl, and lower alkenyl.

For incorporation into synthetic plastic materials, I particularly prefer those compounds of Formula I bearing no water solubilizing groups on the 2H-naphtho[1,2-d]triazole ring, i.e., compounds having the structure of Formula II

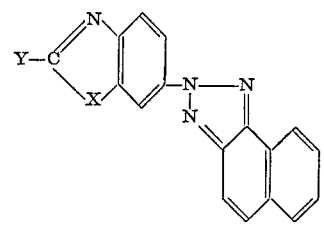

Formula II wherein X and Y have the same meanings indicated hereinabove. These preferred species have been found to have high stability to heat and light in addition to the other advantageous properties common to all my new compounds as set forth above.

A preferred mode of utilizing the compounds of Formula II is to incorporate them into melts of synthetic plastic material for spinning synthetic fibers or for casting or molding plastics in an appropriate concentration, for example 0.01 to 0.1 percent by weight of the melt.

A further method of utilizing the compounds of Formula II is to impregnate textile fabrics comprising synthetic fibers, for example polyester (poly[terephthalic acid ethylene glycol ester]) or nylon, with an aqueous dispersion of the compound at temperatures below about 75° C., for example, at room temperature and then to subject the treated fabric to a dry heat treatment at a temperature above 100° C. The fabric may advantageously be dried at temperatures in the range 60–100° C. prior to the heat treatment, which is preferably carried out at temperatures in the range 125–250° C. Said heat treatment may be accomplished by any of several known methods, for example by heating in a drying chamber, by ironing the fabric, or by treating it with dry superheated steam.

For the preparation of compounds of Formula II, I prefer to employ 2-amino-1-naphthalenesulfonic acid (Tobias acid) as a coupling component with the diazonium salt of the appropriate 6-amino-2-Y-benz-X-azole. It is well known that coupling occurs in the 1-position of Tobias acid with concomitant loss of the sulfonic acid group. Of course, the same amino-azo coupling product will result when 2-aminonaphthalene is employed as a coupling component, but the latter compound is today considered a health hazard and is usually avoided.

A preferred mode of using and marketing those compounds of Formula I which bear carboxy or sulfo substituents is by incorporating them into solid or liquid soaps or detergents in an appropriate concentration, for example 0.01 to 0.05 percent by weight of the whitening and brightening agent. Said compounds are advantageously employed in their alkali metal or ammonium salt forms which are conveniently prepared from the corresponding free acids by the interaction of the latter with alkali metal or ammonium hydroxides. In acid form, these compounds have little or no solubility in water, and in general they are most readily utilizable as dispersions in aqueous media. The treatment of textile fabrics with these compounds is readily carried out by procedures which are conventional in the art. For example, an aqueous dispersion containing about 0.0001 to about 0.5 percent by weight of the compound and one or more suitable dispersing agents, for instance soap or an organic sulfonate or sulfate, is applied to the fabric, which absorbs the fluorescent compound and is whitened or brightened beneficially thereby. This application of the compound can be conveniently carried out in conjunction with either a rinsing or a washing operation.

The dispersions are readily formed, for example, by dissolving the compound in a suitable solvent such as N,N-dimethylformamide, 2-ethoxyethanol, or glacial acetic acid and mixing the solution thus obtained in desired quantity with an aqueous soap or detergent solution. Those compounds of Formula I bearing carboxy or sulfo substituents on the naphthotriazole ring are more readily dispersed in this manner than are those not bearing such substituents, but the latter group of compounds can also be applied in dispersions as described above.

The compounds of Formula I which bear sulfo or carboxy groups on the naphthalene ring thereof are prepared by coupling the above-described diazonium salt of 6-amino-2-Y-benz-X-azole with a carboxy- or sulfo-substituted aminonaphthalene. The resulting amino-azo compounds are oxidized in the above-described manner to produce benzoxazolyl-, benzothiazolyl-, and benzimidazolylnaphtho[1,2-d]triazoles substituted with one or two sulfonic or carboxylic acid groups substituted in the naphthalene ring thereof. Among those aminonaphthalenes of particular value for said coupling reactions are 5-amino-1-naphthalene sulfonic acid (Laurent's acid), 6-amino-2-naphthalenesulfonic acid (Broenner's acid), 6-amino-1,3-naphthalenedisulfonic acid, 7-amino-1,3-naphthalenedisulfonic acid, 3-amino-2,7-naphthalenedisulfonic acid, 1-amino-4,5-naphthalenedisulfonic acid, 2-amino-4,5-naphthalenedisulfonic acid, naphthionic acid, 2-amino-3-naphthoic acid, and the like.

For incorporation into detergents, I particularly prefer those compounds of Formula I bearing a sulfo substituent in the 5-position of the 2H-naphtho[1,2-d]-ring, i.e., compounds having the structure of Formula III

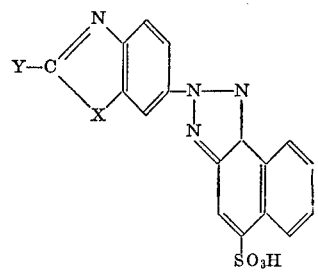

Formula III wherein X and Y are defined above. These preferred species are not only highly substantive to natural and synthetic fibers when applied in aqueous solutions or dispersions, but they also have the advantage of being derived from the relatively inexpensive coupling material, naphthionic acid. Moreover, repeated application of these preferred compounds to white fabrics of natural and synthetic fibers results in an enhancement of the whitening effect without the development of an undesirable color.

The required intermediate 6-amino-2-Y-benz-X'-azole compounds of Formula IV,

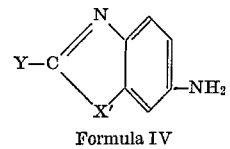

Formula IV wherein Y is defined above and X' is O, S, or NH, are members of a general class known in the art. They are readily prepared by reducing the corresponding 6-nitro-2-Y-benz-X'-azoles, which in turn, are prepared by interacting a carboxylic acid Y-COOH, carboxylic acid ester, Y-COO-lower alkyl, or carboxylic acid chloride, Y-CoCl, with 5-nitro-2-aminophenol, 5-nitro-2-aminothiophenol or 4-nitro-1,2-phenylenediamine, whereupon there is formed, respectively, 6-nitro-2-Y-benzoxazole, 6-nitro-2-Y-benzothiazole or 6-nitro-2-Y-benzimidazole.

The Y substituent and/or the benzo ring of the intermediate in Formula IV above can bear substituents which are chemically inert to other functional groups in the molecule without deleterious effects on the value of the resulting brightener compound. Indeed, I have found that certain substituents, for example alkoxy (e.g., methoxy, ethoxy and the like), lower alkyl (e.g., methyl, isobutyl and the like), halo (e.g., fluoro, chloro and bromo), sulfo, cyano, carboxy, and carbalkoxy groups have the beneficial effect of slightly increasing the emission wavelength of the substituted compound in comparison with the analogous unsubstituted compound. Thus, I envision compounds of Formula I wherein the Y function bears substituents, particularly on the aromatic ring or rings thereof, as the full equivalents of the corresponding compounds herein claimed which are not so substituted.

The intermediate amino-azo compounds prepared by coupling diazotized 6-amino-2-Y-benz-X'-azole compounds to amino-substituted naphthalenes, that is compounds of Formulas V and VI,

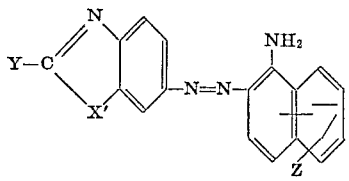

Formula V

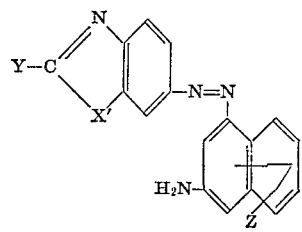

Formula VI wherein X′, Y and Z are defined hereinabove, are new compounds. They are highly-colored pigments ranging in color from orange through red and brown. These compounds are useful as pigments independently of their usefulness as intermediates herein. They can be employed for the various purposes for which azo pigments as a class are well known.

The structures of the new compounds of my invention were determined by their mode of synthesis and by the correspondence of calculated and found values of elemental analyses of representative samples, and were corroborated by ultraviolet and infrared spectral analysis.

My invention is further illustrated by the following examples, without, however, being limited thereto.

EXAMPLE 1

(A) 6-amino-2-styrylbenzoxazole (3.5 g., 0.015 mole) was dissolved in 17 ml. of glacial acetic acid at 70° C., the solution was cooled to 30° C., and 18 ml. of 6 N hydrochloric acid was added. The fine suspension of the hydrochloride salt was cooled to 0° C., and to it was added rapidly 11 ml. of 10 percent aqueous sodium nitrite solution. The resulting diazonium salt was soluble; a trace of insoluble material was removed by filtration, and the clear solution, along with 100 ml. of a 20 percent aqueous solution of sodium acetate, was added to 5 g. of 2-aminonaphthalene-6-sulfonic acid in 100 ml. of water at 15–20° C. When the addition was complete, the pH of the mixture was 4.0 and it gave a negative diazonium test with R salt (the sodium salt of 2-naphthol-3,6-disulfonic acid). The pH was adjusted to 8.2 with 15 percent aqueous sodium hydroxide, and the mixture was heated to 90° C. The orange product, consisting of 2-amino-1-(2-styrylbenzoxazol - 6 - yl) - azonaphthalene-6-sulfonic acid in the form of its sodium salt, was collected on a filter and washed with water.

(B) The entire yield of part A above (19 g.) was dissolved in a mixture of 54 ml. of pyridine and 19 ml. of water heated at reflux. Maintaining the solution at reflux, a solution containing 16.0 g. of copper sulfate pentahydrate in 50 ml. of pyridine and 16 ml. of water was added. When the mixture had refluxed for 15 minutes, the color of the azo dye had disappeared; reflux was continued for a total of two hours. The reaction mixture was poured into 600 ml. of water containing 140 ml. of concentrated hydrochloric acid. The resulting precipitate, consisting of 2-(2-styrylbenzoxazol-6-yl) - 2H - naphtho[1,2-d]triazole-7-sulfonic acid, was collected on a filter and washed with 5 percent sodium chloride solution until the filtrate was colorless. The product was purified first by suspending the filter cake in 200 ml. of water containing 5 g. of sodium carbonate and adding 1 g. of sodium hydrosulfite. It was then recrystallized twice from boiling dimethylformamide, the second time with the aid of decolorizing charcoal. Pure 2-(2-styrylbenzoxazol-6-yl)-2H-naphtho[1,2-d]triazole-7-sulfonic acid thus prepared did not melt at 300° C. Its chemical analysis agreed with the calculated values for a monohydrate. This compound corresponds to Formula I wherein Y is styryl, Z is 7-$SO_3H$, and X is O.

Spectral analysis of this product showed that the compound has a maximum emission at 425 millimicrons and that maximum excitation was obtained at 373 millimicrons.

EXAMPLE 2

(A) 2-styrylbenzoxazolyl - 6 - diazonium chloride was prepared as in Example 1(A) from 3.5 g. of 6-amino-2-styrylbenzoxazole. When this compound was coupled with sodium naphthionate (sodium 1 - amino - 4 - naphthalenesulfonate) there was obtained 1-amino-2-(2-styrylbenzoxazol-6-yl)azonaphthalene-4-sulfonic acid in the form of its sodium salt.

(B) The above-named amino-azo compound was oxidized according to the procedure of Example 1(B). The resulting naphthotriazole compound was decolorized with sodium hydrosulfite and was recrystallized from aqueous dimethylformamide to give 2-(2-styrylbenzoxazol-6-yl)-2H-naphtho[1,2-d]triazole-5-sulfonic acid as a yellow powder which remained unmelted at 300° C. This compound corresponds to Formula I wherein Y is styryl, Z is 5-$SO_3H$ and X is O. Spectral analysis of this product showed a maximum emission at 426 millimicrons and a maximum excitation at 374 millimicrons.

EXAMPLE 3

(A) 2-styrylbenzoxazolyl - 6 - diazonium chloride was prepared as in Example 1(A) from 1.18 g. (0.005 mole) of 6-amino-2-styrylbenzoxazole. When this compound was coupled with Tobias acid (2-amino-1-naphthalenesulfonic acid) there was obtained 2-amino-1-(2-styrylbenzoxazol-6-yl)-azonaphthalene as an orange-red precipitate which melted at 196–206° C. with decomposition.

(B) The above-named amino-azo compound was oxidized according to the procedure of Example 1(B) to obtain 2-(2-styrylbenzoxazol-6-yl)-2H-naphtho[1,2-d]triazole, which melted, after recrystallization from 2-ethoxyethanol, at 218–220° C. This compound corresponds to Formula I wherein Y is styryl, Z is H and X is O.

Spectral analysis of this product showed a maximum emission at 427 millimicrons and a maximum excitation at 382 millimicrons.

EXAMPLE 4

Following the procedure given in Example 1(A), diazotized 6-amino-2-styrylbenzoxazole was coupled with 2-amino-7-naphthalenesulfonic acid to give 2-amino-1-(2-styrylbenzoxazol-6-yl)azonaphthalene-7-sulfonic acid as a scarlet pigment. The amino-azo compound was oxidized in the manner described in Example 1(B) to obtain 2-(2-styrylbenzoxazol-6-yl)-2H-naphtho[1,2 - d]triazole-8-sulfonic acid in the form of its sodium salt monohydrate. The yellow powder remained unmelted at 360° C. This compound corresponds to Formula I wherein Y is styryl, Z is 8-$SO_3H$ and X is oxygen.

Spectral analysis of this product showed a maximum emission at 427 millimicrons and a maximum excitation at 373 millimicrons.

EXAMPLE 5

Following the procedure given in Example 1(A), diazotized 6-amino-2-styrylbenzoxazole was coupled with 2-amino-5-naphthalenesulfonic acid to give 2-amino-1-(2- styrylbenzoxazol-6-yl)azonaphthalene-5-sulfonic acid. The resulting amino-azo pigment was oxidized in the manner described in Example 1(B) to obtain 2-(2-styrylbenzoxazol-6-yl)-2H-naphtho[1,2-d]triazole-6-sulfonic acid in the form of a yellow powder which remained unmelted at 300° C. This compound corresponds to Formula I wherein Y is styryl, Z is 6-$SO_3H$, and X is O.

Spectral analysis of this product showed a maximum emission at 425 millimicrons and a maximum excitation at 382 millimicrons.

EXAMPLE 6

(A) One-tenth mole (22.4) g. of stilbene-4-carboxylic acid was refluxed for two hours with 0.45 mole (51.0 g.) of thionyl chloride to obtain stilbene-4-carboxylic acid chloride. The excess thionyl chloride was stripped off under vacuum. Trichlorobenzene (500 ml.) was added and 100 ml. of the solvent was then stripped off to remove the last traces of thionyl chloride. The reaction mixture was cooled to 90° C. and 17.0 g. (0.11 mole) of 2-amino-5-nitrophenol and 8.7 g. (0.11 mole) of pyridine dissolved in 100 ml. of trichlorobenzene was added. The mixture was stirred at 140° C. for two hours, 1.0 g. of p-toluenesulfonic acid was added, and 200 ml. of the solvent was distilled off to remove the pyridine. The remainder of the reaction mixture was refluxed overnight. When the solution was cooled, the product, 6-nitro-2-stilbylbenzoxazole, separated and was removed by filtration. Recrystallized from toluene with the aid of decolorizing charcoal, pure 6-nitro-2-stilbylbenzoxazole was obtained as yellow crystals melting at 237–238° C.

(B) The nitro compound prepared in Part A was reduced as follows: To a solution containing 5 mg. of stannous chloride and 1.3 ml. of concentrated hydrochloric acid in 600 ml. of 95 percent ethanol was added 12.0 g. (0.2 mole) of iron filings. The mixture was heated to the boiling point and there was added 17.1 g. (0.05 mole) of 6-nitro-2-stilbylbenzoxazole in small portions. The reaction mixture was allowed to reflux overnight. Since the resulting mixture contained insoluble material, 300 ml. of 2-ethoxyethanol was added and the solution was refluxed for an additional four hours. To the resulting clear solution was added 3.0 g. of sodium carbonate and 2.0 g. of dibasic sodium phosphate. The mixture was then refluxed for ten minutes, decolorizing charcoal was added, and the solution was filtered hot. The solvent was stripped off to a final volume of 250 ml. and the mixture was poured into one liter of 5 percent sodium chloride solution. The resulting yellow precipitate was removed by filtration and was washed with water. The 6 - amino-2-stilbylbenzoxazole thus obtained contained a trace of starting material as an impurity as observed by infrared spectral analysis. When the reduction was repeated as above, it was found that the nitro compound had been completely reduced. Recrystallized from butanol, the pure 6-amino - 2 - stilbylbenzoxazole thus prepared melted at 240–241° C.

(C) Following the procedure given in Example 1(A) but using 6.24 g. (0.02 mole) of 6-amino-2-stilbylbenzoxazole in place of the 6-amino-2-styrylbenzoxazole therein, there was obtained 2-stilbylbenzoxazol-6-yl diazonium chloride which was coupled with 2 - aminonaphthalene-1-sulfonic acid to obtain 2-amino-1-(2-stilbylbenzoxazol-6-yl)azonaphthalene as a red pigment melting at 187° C.

(D) Following the procedure given in Example 1(B), the above-named amino-azo compound was oxidized to obtain 2 - (2 - stilbylbenzoxazol-6-yl)-2H-naphtho[1,2-d] triazole as a yellow powder melting at 272–276° C. This compound corresponds to Formula I wherein X is O, Y is 4-stilbyl and Z is H.

Spectral analysis of this product showed a maximum emission at 431 millimicrons and a maximum excitation at 376 millimicrons.

EXAMPLE 7

(A) The procedure given in Example 6 was repeated with the exception that 2-stilbylbenzoxazol-6-yl diazonium chloride was coupled with naphthionic acid to obtain 1-amino - 2 - (2 - stilbylbenzoxazol-6-yl)azonaphthalene-4-sulfonic acid in the form of its sodium salt as a red pigment.

(B) Following the procedure given in Example 1(B), the above-named amino-azo compound was oxidized to obtain 2 - (2-stilbylbenzoxazol-6-yl)-2H-naphtho-[1,2-d] triazole-5-sulfonic acid in the form of its sodium salt monohydrate. This compound corresponds to Formula I wherein X is O, Y is 4-stilbyl and Z is 5-$SO_3H$.

Spectral analysis of this compound showed a maximum emission at 43 millimicrons and a maximum excitation at 377 millimicrons.

EXAMPLE 8

(A) Following the procedure given in Example 6(A) with the exception that β-naphthoic acid was employed instead of stilbene-4-carboxylic acid, there was obtained 2-(β-naphthyl) - 6-nitrobenzoxazole, which when recrystallized from chlorobenzene melted at 215–216° C.

(B) To a refluxing mixture containing 15.0 g. (0.25 mole) of iron filings in 400 ml. of 70 percent aqueous acetic acid was added 14.5 g. (0.05 mole) of 2-(β-naphthyl)-6-nitrobenzoxazole (part A above). The mixture was refluxed for 2.25 hours. It was then filtered and the filtrate was diluted with water. The product was collected on a filter and was recrystallized from 60 percent aqueous methanol with the aid of decolorizing charcoal to obtain 2-(β-naphthyl-6-aminobenzoxazole) which melted at 175–180° C.

(C) Following the general procedure given in Example 1(A), 2-(β-naphthyl)-6-aminobenzoxazole was diazotized and coupled with naphthionic acid to give 1-amino-2-[2-(β - naphthyl(benzoxazol-6-yl]azonaphthalene-4-sulfonic acid in the form of its sodium salt.

(D) Following the procedure given in Example 1(B), the above-named amino-azo pigment was oxidized to give 2 - [2 - (β-naphthyl)benzoxazol-6-yl]-2H-naphtho[1,2-d] triazole - 5 - sulfonic acid in the form of its sodium salt monohydrate. The pale yellow powder remained unmelted at 360° C. This compound corresponds to Formula I wherein X is O, Y is β-naphthyl and Z is 5-$SO_3H$.

Spectral analysis of this compound showed a maximum emission at 413 millimicrons and a maximum excitation at 363 millimicrons.

EXAMPLE 9

(A) 2-(β-naphthyl)benzoxazol-6-yl diazonium chloride prepared as in Example 8(C) was coupled with Tobias acid to obtain 2-amino-1-[2(β-naphthyl)benzoxazol-6-yl] azonaphthalene as a red pigment melting at 173–176° C.

(B) The above-named amino-azo compound was oxidized in the manner described in Example 1(B) to obtain 2-[2(β-naphthyl)benzoxazol-6-yl]naphtho[1,2-d]triazole which melted at 264–265° C. This compound corresponds to Formula I wherein X is O, Y is β-naphthyl and Z is H.

Spectral analysis of this product showed a maximum emission at 411 millimicrons and a maximum excitation at 361 millimicrons.

EXAMPLE 10

(A) Following the procedure given in Example 6(A), 4-methylcinnamic acid was converted to the corresponding acid chloride which in turn was interacted with 2-amino-5-nitrophenol to give 2-(4-methylstyryl - 6 - nitrobenzoxazole as yellow crystals which, after recrystallization from xylene, melted at 182–183° C.

(B) The 2-(4-methylstyryl) - 6 - nitrobenzoxazole prepared in Part A (13.7 g.; 0.05 mole) was reduced by refluxing an alcoholic solution of the compound with 11.5 g. of iron filings and 2.5 ml. of concentrated hydrochloric acid containing a trace of stannous chloride, according to the general procedure given in Example 6(B). The resulting yellow crystals, consisting of 2-(4-methylstyryl)-6-aminobenzoxazole, melted at 192–192.5° C.

(C) Following the procedure given in Example 6(C), 2-(4-methylstyryl) - 6 - aminobenzoxazole was diazotized and coupled with 2-aminonaphthalene - 1 - sulfonic acid (Tobias acid) to give 2-amino-1-[2(4-methylstyryl)benzoxazol-6-yl]azonaphthalene as a dark red pigment.

(D) Following the procedure given in Example 6(D), the above-named amino-azo compound was oxidized to obtain 2-[2-(4-methylstyryl)benzoxazol-6-yl]-2H-naphtho[1,2-d]-triazole as a yellow powder melting at 235–236° C. This compound corresponds to Formula I wherein X is O, Y is 4-methylstyryl and Z is H.

Spectral analysis of this product showed a maximum emission of 430 millimicrons and a maximum excitation at 375 millimicrons.

EXAMPLE 11

(A) Following the procedure given in Example 1(A), 2-(4-methylstyryl)-6-aminobenzoxazole (Example 10(B)) was diazotized and coupled with naphthionic acid to give 1-amino-2-[2(4-methylstyryl)benzoxazol - 6 - yl]azonaphthalene-4-sulfonic acid in the form of its sodium salt as a scarlet pigment.

(B) Following the procedure given in Example 1(B), the above-named amino-azo compound was oxidized to obtain 2-[2-(4-methylstyryl)benzoxazol-6-yl-2H-naphtho-[1,2-d-triazole-5-sulfonic acid in the form of its sodium salt monohydrate. The pale yellow powder remained unmelted at 300° C. This compound corresponds to Formula I wherein X is O, Y is 4-methylstyryl and Z is 5-SO$_3$H.

Spectral analysis of this product showed a maximum emission at 430 millimicrons and a maximum excitation at 374 millimicrons.

EXAMPLE 12

(A) Following the procedure given in Example 6(A), coumarin-3-carboxylic acid was converted to the corresponding acid chloride which in turn was interacted with 2-amino - 5 - nitrophenol to obtain 2-(3-coumarinyl)-6-nitrobenzoxazole which melted at 298–300° C.

(B) Following the procedure given in Example 8(B), 2-(3-coumarinyl) - 6 - nitrobenzoxazole was reduced with iron and 70 percent aqueous acetic acid to obtain 2-(3-coumarinyl)-6-aminobenzoxazole which melted at 250–270° C.

(C) Following the procedure given in Example 1(A), 2-(3-coumarinyl)-6-aminobenzoxazole was diazotized and coupled with 2-aminonaphthalene-1-sulfonic acid (Tobias acid) to obtain 2-amino-1-[2(3-coumarinyl)benzoxazole-6-yl]azonaphthalene.

(D) Following the procedure given in Example 1(B), the above-named amino-azo compound was oxidized to obtain 2-[2-(3-coumarinyl)benzoxazol - 6 - yl]-2H-naphtho[1,2-d]triazole. This compound corresponds to Formula I wherein X is O, Y is 3-coumarinyl, and Z is H.

EXAMPLE 13

(A) Polyphosphoric acid (360 g.) was heated to 60° C. and to it was added 98 g. (1 mole) of maleic anhydride. While stirring was maintained, 54.5 g. (0.05 mole) of orthoaminophenol was added, and the mixture was heated rapidly to 155° C. After the mixture had been heated for four hours it was drowned in 2 liters of cold water. The resulting precipitate was collected on a filter and washed with 5 percent sodium chloride solution until free of acid. The 3-(benzoxazol-2-yl)acrylic acid thus prepared was purified by dissolving it in sodium carbonate solution, filtering the solution and reprecipitating the free acid. The product melted at 218–225° C. The 3-(benzoxazol-2-yl)acrylic acid (65 g.) was then condensed with 49.3 g. of 5-nitro-2-aminophenol in 400 g. of polyphosphoric acid as above. The resulting 2-[2-benzoxal-2-yl)vinyl]-6-nitrobenzoxazole melted at 246–248° C.

(B) The 2-[2(benzoxazol-2-yl)vinyl] - 6 - nitrobenzoxazole was reduced with iron and hydrochloric acid in refluxing ethanol according to the procedure described in Example 6(B) to obtain 2-[2-(benzoxazol-2-yl)vinyl]-6-aminobenzoxazole at 272–278° C., after recrystallization from 2-ethoxyethanol.

(C) Following the procedure given in Example 1(A), 2-[2-(benzoxazol-2-yl)vinyl]-6-aminobenzoxazole was diazotized and coupled with naphthionic acid to obtain 1-amino-2-[2-(2-benzoxazol-2-yl)vinyl)benzoxazol - 6 - yl] azonaphthalene-4-sulfonic acid in the form of its sodium salt as a dark brown-red pigment.

(D) Following the procedure given in Example 1(B), the above-named amino-azo compound was oxidized to obtain 2-[2-([benzoxazol-2-yl]vinyl)benzoxazol-6-yl]-2H-naphtho[1,2-d]triazole-5-sulfonic acid in the form of its sodium salt monohydrate. This compound corresponds to Formula I wherein X is O, Y is 2-(benzoxazol-2-yl)vinyl and Z is 5-SO$_3$H.

EXAMPLE 14

(A) Following the procedure given in Example 6(A), benzofuran - 2 - carboxylic acid was converted to the corresponding acid chloride and condensed with 2-amino-5-nitrophenol to give 2-(benzofuran - 2 - yl)-6-nitrobenzoxazole which melted at 230–231° C.

(B) Following the general procedure given in Example 6(B), 2 - (benzofuran - 2 - yl) - 6 - nitrobenzoxazole was reduced with iron filings and hydrochloric acid in 50 percent 2 - ethoxyethanol to obtain 2 - (benzofuran - 2 - yl)-6 - aminobenzoxazole which, following recrystallization from 2-ethoxyethanol, melted at 245–246° C.

(C) Following the general procedure given in Example 1(A), 2 - (benzofuran - 2 - yl) - 6 - aminobenzoxazole was diazotized and coupled with 2 - aminonaphthalene-1-sulfonic acid (Tobias acid) to obtain 2 - amino - 1 - [2-(benzofuran - 2 - yl)benzoxazol - 6 - yl]azonaphthalene which melted at 220–222° C.

(D) Following the procedure given in Example 1(B), the above-named amino-azo compound was oxidized to obtain 2-[2-(benzofuran - 2 - yl) benzoxazol - 6 - yl]-2H-naphtho[1,2-d]-triazole as a yellow powder which melted at 250–251° C. after recrystallization from pyridine. This compound corresponds to Formula I wherein X is O, Y is 2-benzofuranyl and Z is H.

EXAMPLE 15

(A) Following the general procedure given in Example 6(A), 33.3 g. (0.2 mole) of cinnamoyl chloride was interacted with 4 - nitro - 1,2 - phenylenediamine to give 6-nitro - 2 - styryl-benzimidazole, which melted at 105–120° C. This material was not further purified, but rather was used directly for the next step.

(B) The above-mentioned 6 - nitro - 2 - styrylbenzimidazole was reduced with stannous chloride and concentrated hydrochloric acid in refluxing 2-ethoxyethanol to give 6 - amino - 2 - styrylbenzimidazole, which melted at 191–193° C. after recrystallization from 95 percent ethanol.

(C) Following the procedure given in Example 1(A), 6 - amino - 2 - styrylbenzimidazole was diazotized and coupled with Tobias acid to obtain 2-amino-1-(2-styrylbenzimidazol-6-yl)azonaphthalene as a dull red pigment.

(D) Following the procedure given in Example 1(B), the above-named amino-azo compound was oxidized to obtain 2-(2-styrylbenzimidazol - 6 - yl) - 2H-naphtho-[1,2-d]triazole as a yellow powder melting at 184–194° C. with decomposition. This compound corresponds to Formula I wherein X is NH, Y is styryl and Z is H.

EXAMPLE 16

When 2 - (2 - styrylbenzimidazol - 6 - yl) - 2H - naphtho[1,2-d]triazole of Example 15 is interacted with an equimolecular quantity of ethylenechlorohydrin in refluxing methoxyethanol in the presence of a stoichiometric quantity of 50 percent aqueous sodium hydroxide solution there is obtained 2 - [1 - (2-hydroxyethyl)-2-styrylbenzimidazol - 6 - yl]-2H-naphtho[1,2-d]triazole. This compound corresponds to Formula I wherein X is

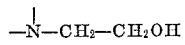

Y is styryl and Z is H.

EXAMPLE 17

When 2-(2-styrylbenzimidazol - 6 - yl) - 2H - naphtho[1,2-d]triazole of Example 15 is interacted with an equimolecular quantity of allyl chloride in refluxing methoxyethanol in the presence of a stoichiometric quantity of 50 percent aqueous sodium hydroxide solution there is obtained 2 - (1 - allyl - 2 - styrylbenzimidazole - 6 - yl)-2H-naphtho-[1,2-d]triazole. This compound corresponds to Formula I wherein X is

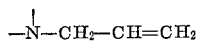

Y is styryl, and Z is H.

EXAMPLE 18

When 2 - (2 - styrylbenzimidazol - 6 - yl)-2H-naphtho-[1,2-d]triazole of Example 15 is interacted with an equimolecular quantity of acrylonitrile in 2-ethoxyethanol at about 50° C. in the presence of a stoichiometric quantity of 50 percent aqueous sodium hydroxide solution and a trace of cuporus chloride to retard polymerization of the acrylonitrile, there is obtained 2 - [1 - (2-cyanoethyl)-2-styrylbenzimidazol - 6 - yl] - 2H - naphtho[1,2-d]triazole. This compound corresponds to Formula I wherein X is

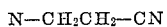

Y is styryl and Z is H.

Similarly, when 2-(2-styrylbenzimidazole - 6 - yl)-2H-naphtho[1,2-d]triazole is interacted with the following reagents, the indicated products of my invention are produced:

| Reagent | Product |
|---|---|
| Styrene oxide | 2-[1-(2-phenyl-2-hydroxyethyl)-2-styryl-benzimidazol-6-yl]-2H-naphthol[1,2-d]triazole. |
| Methyl iodide | 2-(1-methyl-2-styrylbenzimidazol-6-yl)-2H-naphtho[1,2-d]triazole. |
| Ethyl bromide | 2-(1-ethyl-2-styrylbenzimidazol-6-yl)-2H-naphtho[1,2-d]triazole. |
| α-Chloroacetic acid | 2-(1-carboxymethyl-2-styrylbenzimidazol-6-yl)-2H-naphtho-[1,2-d]triazole. |
| Ethyl β-chloropropionate | 2-[1-(β-carbethoxyethyl)-2-styrylbenzimidazol-6-yl]-2H-naphtho[1,2-d]triaffiole. |
| Methallyl chloride | 2-(1-methallyl-2-styrylbenzimidazol-6-yl)-2H-naphtho[1,2-d]-triazole. |
| 2-hydroxy-3-(2-hydroxyethoxy)propyl chloride. | 2-[1-(2-hydroxy-3-(2-[hydroxyethoxy]propyl)-2-styrylbenzimidazol-6-yl]-2H-naphtho[1,2-d]triazole. |
| 2,3-dihydroxypropyl chloride. | 2-[1-(2,3-dihydroxypropyl)-2-styrylbenzimidazol-6-yl]-2H-naphtho[1,2-d]triazole. |
| Benzyl chloride | 2(1-benzyl-2-styrylbenzimidazol-6-yl)-2H-naphtho[1,2-d]triazole. |
| Phenethyl bromide | 2-(1-phenethyl-2-styrylbenzimidazol-6-yl)-2H-naphtho[1,2-d]triazole. |
| p-Methoxybenzyl chloride | 2-[1-(p-methoxybenzyl)-2-styrylbenzimidazol-6-yl]-2H-naphtho-[1,2-d]triazole. |

EXAMPLE 19

Following the procedures given in Example 15, when 6-amino-2-styrylbenzimidazole is diazotized and coupled with naphthionic acid instead of 2 - aminonaphthalene-1-sulfonic acid (Tobias acid), there is obtained 1-amino-2-(2-styrylbenzimidazol-6-yl)azonaphthalene - 4 - sulfonic acid, which when oxidized in the usual manner yields 2-(2- styrylbenzimidazol-6-yl) - 2H - naphtho[1,2-d]triazole-5-sulfonic acid. This compound correspond to Formula I wherein X is NH, Y is styryl and Z is 5-SO$_3$H.

EXAMPLE 20

(A) Dibenzofuran-2-carboxylic acid (5.25 g.; 0.025 mole) was converted to its acid chloride and the latter compound was interacted with an equimolecular quantity of 2-amino-5-nitrophenol according to the procedure given in Example 6(A) to obtain 2-(dibenzofuran-2-yl)-6-nitrobenzoxazole which melted at 231–232° C. after recrystallization from trichlorobenzene.

(B) Following the procedure given in Example 6(B), 2-(dibenzofuran-2-yl) - 6 - nitrobenzoxazole is reduced to obtain 2-(dibenzofuran-2-yl)-6-aminobenzoxazole.

(C) By diazotization and coupling of 2-(dibenzofuran-2-yl)-6-aminobenzoxazole with 2-aminonaphthalene-1-sulfonic acid according to the foregoing procedures there is obtained 2-amino-1-[2-(dibenzofuran-2-yl)benzoxazol-6-yl]azonaphthalene.

(D) Oxidation of the above-named amino-azo compound according to the foregoing procedures yields 2-[2-(dibenzofuran-2-yl)benzoxazol - 6 - yl] - 2H - naphtho-[1,2-d]triazole. This compound corresponds to Formula I wherein X is O, Y is dibenzofuran-2-yl, and Z is H.

EXAMPLE 21

(A) Following the procedure given in Example 1(A), cinnamoyl chloride is interacted with 2-amino-5-nitrothiophenol to obtain 2-styryl-6-nitrobenzothiazole.

(B) Reduction of the 2-styryl-6-nitrobenzothiazole of part A by means of iron filings and acetic acid in accordance with the procedure given in Example 8(B) yields 2-styryl-6-aminobenzothiazole.

(C) Following the procedure given in Example 1(A), diazotization of 2-styryl-6-aminobenzothiazole and coupling of the resulting diazonium chloride with Tobias acid, there is obtained 2-amino-1-(2-styrylbenzothiazol-6-yl)-azonaphthalene.

(D) Following the procedure given in Example 1(B), the above-named amino-azo compound is oxidized to obtain 2-(2-styrylbenzothiazol - 6 - yl) - 2H - benzo[1,2-d] triazole. This compound corresponds to Formula I wherein X is S, Y is styryl, and Z is H.

EXAMPLE 22

(A) When 2-styryl-6-aminobenzothiazole of Example 21(B) is diazotized as described in Example 1(A) and coupled with naphthionic acid, there is obtained 1-amino-2-(2-styrylbenzothiazol-6-yl)azonaphthalene - 4 - sulfonic acid.

(B) Oxidation of the above-named amino-azo compound according to the procedure given in Example 1(B) yields 2 - (2 - styrylbenzothiazol - 6 - yl) - 2H - naphtho [1,2-d]triazole-5-sulfonic acid, which is conveniently used in the form of its sodium salt. This compound corresponds to Formula I wherein X is S, Y is styryl and Z is 5-SO$_3$H.

EXAMPLE 23

(A) Following the general procedure given in Example 1(A), diazotized 2-styryl-6-aminobenzoxazole is coupled with 2 - amino-3-naphthoic acid to obtain 2-amino-1-(2-styrylbenzoxazol-6-yl)azonaphthalene-3-carboxylic acid.

(B) Oxidation of the above-named amino-azo compound according to the procedure given in Example 1(B) yields 2 - (2 - styrylbenzoxazol - 6 - yl) - 2H - naphtho [1,2-d]triazole-4-carboxylic acid. This compound corresponds to Formula I wherein X=O, Y=styryl and Z=4-COOH.

To further exemplify my invention, there may also be prepared according to the procedures illustrated above, the following amino-azo compounds of my invention. The starting materials and processes for preparing these pigments will be obvious to one skilled in the art in view of the foregoing disclosure.

2-amino-1-[2-(4-phenyl-1,3-butadienyl)benzoxazol-6-yl]azonaphthalene
2-amino-1-[2-(9-phenanthryl)benzoxazol-6-yl]azonaphthalene-6-sulfonic acid
2-amino-1-[2-(2-indenyl)benzothiazol-6-yl]azonaphthalene-3-carboxylic acid
1-amino-2-[2-(3-quinolinyl)benzothiazol-6-yl]azonaphthalene-4-sulfonic acid
1-amino-2-[2-(4-[2-furyl]-1,3-butadienyl)benzothiazol-6-yl]azonaphthalene-4-sulfonic acid
1-amino-2-[2-(9-fluorenylidenylmethyl)benzoxazol-6-yl]azonaphthalene-4,5-dicarboxylic acid
2-amino-1-[2-(2-[2-benzofuranyl]vinyl)benzimidazol-6-yl]azonaphthalene-3,6-disulfonic acid
2-amino-1-[2-(6-methoxybenzofuran-2-yl)benzimidazol-6-yl]azonaphthalene-6-sulfonic acid
1-amino-2-[2-(2-[β-naphthyl]vinyl)benzothiazol-6-yl]azonaphthalene-4-sulfonic acid
2-amino-1-[2-(2-[β-naphthyl]vinyl)benzoaxazol-6-yl]azonaphthalene
2-amino-1-[2-(2-[α-naphthyl]vinyl)benzoxazol-6-yl]azonaphthalene
2-amino-1-[2-(3-methoxy-2-naphthyl)benzoxazol-6-yl]azonaphthalene
2-amino-1-[2-(4-phenylstyryl)benzoxazol -6-yl]azonaphthalene
2-amino-1-[2-(2-indolyl)benzoxazol-6-yl]azonaphthalene
2-amino-1-[2-(6-methoxybenzofuran-2-yl)benzoaxazol-6-yl]azonaphthalene
2-amino-1-[2-(6-methoxy-3-methylbenzofuran-2-yl)benzoxazol-6-yl]azonaphthalene
2-amino-1-[2-(2-[4-pyridyl]vinyl)benzoxazol-6-yl]azonaphthalene
1-amino-2-[2-(2-[2-pyridyl]vinyl)benzoxazol-6-yl]azonaphthalene-4-sulfonic acid
1-amino-2-[2-(6-methyl-2-benzofuranyl)benzimidazol-6-yl]azonaphthalene-4-sulfonic acid By oxidation of the foregoing amino-azo compounds according to the procedure disclosed hereinabove there is obtained the following naphtho[1,2-d]triazole compounds of my invention:

2-[2-(4-phenyl-1,3-butadienyl)benzoxazol-6-yl]-2H-naphtho[1,2-d]triazole
2-[2-(9-phenanthryl)benzoxazol-6-yl]-2H-naphtho-[1,2-d]triazole-7-sulfonic acid
2-[2-(2-indenyl)benzothiazol-6-yl]-2H-naphtho[1,2-d]triazole-4-carboxylic acid
2-[2-(3-quinolinyl)benzothiazol-6-yl]-2H-naphtho-[1,2-d]triazole-5-sulfonic acid
2-[2-(4-(2-furyl)-1,3-butadienyl)benzothiazol-6-yl]-2H-naphtho[1,2-d]triazole-5-sulfonic acid
2-[2-(9-fluorenylidenylmethyl)benzoxazol-6-yl]-2H-naphtho[1,2-d]triazole-5,6-dicarboxy acid
2-[2-(2-[2-benzofuranyl]vinyl)benzimidazol-6-yl]-2H-naphtho[1,2-d]triazole-4,7-disulfonic acid
2-[2-(6-methoxybenzofuran-2-yl)benzimidazol-6-yl]-2H-naphtho-[1,2-d]triazole-7-sulfonic acid
2-[2-(2-[β-naphthyl]vinyl)benzothiazol-6-yl]-2H-naphtho[1,2-d]triazole-5-sulfonic acid
2-[2-(2-[β-naphthyl]vinyl)benzoxazol-6-yl]-2H-naptho[1,2-d]triazole
2-[2-(2-[α-naphthyl]vinyl)benzoxazol-6-yl]-2H-naphtho[1,2-d]triazole
2-[2-(3-methoxy-2-naphthyl)benzoxazol-6-yl]-2H-naphtho[1,2-d]triazole
2-[2-(4-phenylstyryl)benzoxazol-6-yl]-2H-naphtho-[1,2-d]triazole
2-[2-(2-indolyl)benzoxazol-6-yl]-2H-naphtho[1,2-d]triazole
2-[2-(6-methoxybenzofuran-2-yl)benzoxazol-6-yl]-2H-naphtho[1,2-d]triazole
2-[2-(6-methoxy-3-methylbenzofuran-2-yl)benzoxazol-6-yl]-2H-naphtho[1,2-d]triazole
2-[2-(2-[4-pyridyl]vinyl)benzoxazol-6-yl]-2H-naphtho-[1,2-d]triazole
2-[2-(2-[2-pyridyl]vinyl)benzoxazol-6-yl]-2H-naphtho-[1,2-d]triazole-5-sulfonic acid
2-[2-(6-methyl-2-benzofuranyl)benzoxazol-6-yl]-2H-naphtho[1,2-d]triazole-5-sulfonic acid.

EXAMPLE 24

A detergent composition containing an effective whitening and brightening amount of 2-(2-styrylbenzoxazol-6-yl)-2H-naphtho[1,2-d]triazole-5-sulfonic acid was prepared as follows:

An accurately-weighed sample of 100.0 mg. of the brightener compound (Example 2) was placed in a mixing tube along with 10–20 granules of solid white detergent (consisting of sodium alkyl sulfates and sulfonates and a builder of sodium tripolyphosphate) and one ml. of 1 N sodium hydroxide solution. The mixture was triturated for 30 seconds with a motor-driven pestle. Twenty grams of the solid white detergent and 17 ml. of water were then added and the mixture was triturated again for one minute. The mixture was then placed in a Petri-dish and dried in a forced air oven at 105° C. for two hours. The cake was broken up with a spatula, and the chunks were forced through a 20-mesh sieve. The screened material was collected on a 60-mesh sieve and shaken to remove the fines. The resulting brightener-detergent composition retained on the 60-mesh screen was used for testing the composition in accordance with standard tests employed in the brightener and detergent trades.

I claim:

1. A detergent composition consisting essentially of a detergent selected from the class consisting of soaps, organic sulfates, and organic sulfonates having incorporated therein an effective whitening and brightening amount of a compound of the formula

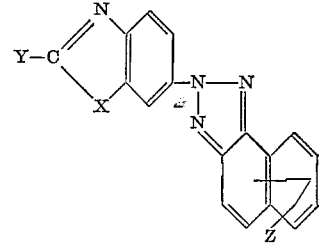

wherein X is a member of the class consisting of O, S and N-R, where R is a member of the class consisting of H, lower-alkyl, hydroxy-lower alkyl, hydroxy-oxaalkyl, phenyl-lower alkyl, cyano-lower alkyl, carboxy-lower alkyl, carbo-lower alkoxy-lower alkyl, phenyl - hydroxy - lower alkyl, and lower alkenyl; Y is a member of the class consisting of styryl, 4-stilbyl, 2-benzofuranyl, 2-(6-methoxybenzofuranyl), 2 - (6-methoxy-3-methylbenzofuranyl), 2-(β-naphthyl)vinyl, 2-(α-naphthyl)vinyl, 4-phenyl-1,3-butadienyl, 3-coumarinyl, 9-phenanthryl, 3-quinolinyl, 3-methoxy-2-naphthyl and 4-phenylstyryl; and Z is a member of the class consisting of H, 1–2 carboxy and 1–2 sulfo groups.

2. A detergent composition according to claim 1 having incorporated therein as the whitening and brightening agent, a compound of the formula

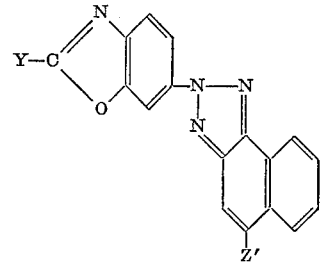

wherein Y has the same meaning indicated in claim 1 and Z' is a member of the group consisting of H and $SO_3H$.

3. A detergent composition according to claim 2 having incorporated therein as the whitening and brightening agent, a compound of the formula
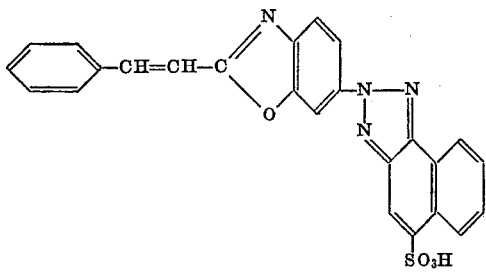
References Cited
UNITED STATES PATENTS
2,713,056 7/1955 Sartori _____ 260—304
2,993,892 7/1961 Strobel et al. _____ 260—240
LEON D. ROSDOL, Primary Examiner
P. E. WILLIS, Assistant Examiner
U.S. Cl. X.R.
252—110, 301.2, 524, 531, 535, 539, 543, 550, 554, 558; 260—240 C, 240 CA, 240 D, 288, 304, 306.8, 307, 308